US009016165B2

(12) United States Patent
Tost et al.

(10) Patent No.: US 9,016,165 B2
(45) Date of Patent: Apr. 28, 2015

(54) POWER TOOL WITH BOWDEN CABLE

(71) Applicant: Andreas Stihl AG & Co. KG, Waiblingen (DE)

(72) Inventors: Christopher Tost, Affalterbach (DE); Arno Kinnen, Fellbach (DE); Igor Klaric, Zagreb (HR)

(73) Assignee: Andreas Stihl AG & Co. KG, Waiblingen (DE)

( * ) Notice: Subject to any disclaimer, the term of this patent is extended or adjusted under 35 U.S.C. 154(b) by 114 days.

(21) Appl. No.: 13/707,659

(22) Filed: Dec. 7, 2012

(65) Prior Publication Data

US 2014/0000407 A1     Jan. 2, 2014

(30) Foreign Application Priority Data

Dec. 7, 2011    (DE) ......................... 10 2011 120 469

(51) Int. Cl.
*F16C 1/10*      (2006.01)
*F16C 1/26*      (2006.01)
*B25F 5/02*      (2006.01)

(52) U.S. Cl.
CPC . *F16C 1/10* (2013.01); *F16C 1/102* (2013.01); *F16C 1/262* (2013.01); *B25F 5/02* (2013.01)

(58) Field of Classification Search
USPC ................... 74/473.14, 473.15, 500.5, 502.4; 30/166.3, 206, 388
See application file for complete search history.

(56) References Cited

U.S. PATENT DOCUMENTS

| | | | |
|---|---|---|---|
| 3,805,758 A | 4/1974 | May | |
| 4,205,637 A | 6/1980 | Ito et al. | |
| 4,245,713 A * | 1/1981 | Mochida et al. | 180/176 |
| 4,253,433 A | 3/1981 | Blair | |
| 4,438,733 A | 3/1984 | Sasaki | |
| 5,142,934 A * | 9/1992 | Persson et al. | 74/502.4 |
| 5,419,686 A | 5/1995 | Wissmann et al. | |
| 5,488,933 A | 2/1996 | Pham | |
| 5,664,532 A | 9/1997 | August | |
| 5,699,761 A | 12/1997 | Yamaguchi et al. | |
| 5,727,506 A | 3/1998 | Tajima et al. | |
| 5,899,179 A | 5/1999 | Sasaki et al. | |
| 6,135,071 A | 10/2000 | Kobayashi et al. | |
| 6,196,170 B1 | 3/2001 | Singer et al. | |
| 6,701,900 B1 | 3/2004 | Millar et al. | |

(Continued)

FOREIGN PATENT DOCUMENTS

| | | |
|---|---|---|
| CA | 2251764 A1 | 10/1997 |
| DE | 197 32 741 A1 | 7/1997 |

(Continued)

*Primary Examiner* — Vicky Johnson

(74) *Attorney, Agent, or Firm* — Gudrun E. Huckett

(57) ABSTRACT

A power tool has a drive motor with an actuating element. The power tool has a power tool housing with a first subassembly and a second subassembly that is connected with the first subassembly. An operating element is supported on the first subassembly. A Bowden cable is disposed within the power tool housing and has a Bowden cable housing and a Bowden cable inner wire arranged in the Bowden cable housing. The actuating element is a part of the second subassembly. The Bowden cable inner wire has a first end connected to the operating element and a second end connected to the actuating element, wherein the operating element acts on the actuating element through the Bowden cable. The Bowden cable housing has a first end and a second end and the first and second ends are secured on the same one of the first and second subassemblies.

13 Claims, 5 Drawing Sheets

(56) References Cited

U.S. PATENT DOCUMENTS

| | | |
|---|---|---|
| 6,938,884 B2 | 9/2005 | Knaus et al. |
| 7,325,528 B2 | 2/2008 | Schieber et al. |
| 7,552,714 B2 | 6/2009 | Maier et al. |
| 7,743,751 B2 | 6/2010 | Yonemoto |
| 2004/0168656 A1 | 9/2004 | Carlsson et al. |
| 2009/0007892 A1 | 1/2009 | Burkitt |
| 2010/0018734 A1* | 1/2010 | Frauhammer et al. ........ 173/171 |
| 2011/0140707 A1 | 6/2011 | Böker et al. |

FOREIGN PATENT DOCUMENTS

| | | |
|---|---|---|
| EP | 0 280 923 A2 | 9/1988 |
| EP | 0 440 401 A1 | 8/1991 |
| EP | 1 614 901 A1 | 1/2006 |
| EP | 1 772 221 A1 | 4/2007 |
| EP | 1 775 442 A1 | 4/2007 |
| GB | 885 152 A | 12/1961 |
| GB | 2 165 003 A | 4/1986 |
| JP | 2008 045489 A | 2/2008 |
| WO | 2005/025822 A1 | 3/2005 |

* cited by examiner

POWER TOOL WITH BOWDEN CABLE

BACKGROUND OF THE INVENTION

The invention concerns a power tool with a Bowden cable. The power tool has a drive motor for driving a tool member and comprises a power tool housing that is at least partially formed by a first subassembly and a second subassembly connected with the first subassembly. An operating element is supported on the first subassembly and actuates by means of a Bowden cable guided within the power tool housing an actuating element of the drive motor. The actuating element is part of the second subassembly. The Bowden cable comprises a Bowden cable inner wire and a Bowden cable housing, wherein the Bowden cable inner wire is secured with a first end on the operating element and with a second end on the actuating element.

U.S. Pat. No. 5,142,934 discloses a power tool, namely a motor chainsaw, where the throttle trigger actuates the carburetor by means of a Bowden cable. The throttle trigger is secured on a grip housing and the carburetor on a motor housing. The two housing parts are connected to each other by elastic elements. One end of the Bowden cable housing is secured on the motor housing and the other end of the Bowden cable housing on the grip housing. One end of the inner wire of the Bowden cable is hooked to the throttle lever and the other end to the throttle trigger. When mounting this Bowden cable, one end can be secured first on the throttle lever and on the motor housing. Subsequently, the motor housing can be arranged on the grip housing and the free end of the Bowden cable can be hooked on the grip housing or on the throttle trigger. This type of assembly is possible only when the Bowden cable can still be accessed after the two housing parts have been attached to each other.

The invention has the object to create a power tool of the aforementioned kind in which installation of the Bowden cable is possible in a simple way even at mounting locations that are difficult to access.

SUMMARY OF THE INVENTION

This object is solved by a power tool where the two ends of the Bowden cable housing are secured on the same one of the two subassemblies.

Since both ends of the Bowden cable housing are secured on the same subassembly, both ends of the Bowden cable housing can be mounted on said subassembly before the second subassembly is connected to said subassembly. After connecting the two subassemblies to each other, it is only necessary to hook the Bowden cable inner wire onto the second subassembly. This is possible easily because the position of the Bowden cable inner wire is substantially predetermined as a result of the Bowden cable housing being positionally fixed at this end. Accordingly, a Bowden cable installation is possible very well even in very tight spatial conditions. After having connected the subassemblies to each other, only the free end of the Bowden cable inner wire must be accessible.

A Bowden cable is to be understood as any flexible transmission element that comprises a housing secured at two spaced-apart regions and an element that is movable relative to this housing. The regions where the housing is secured are referred to as ends. The ends of the Bowden cable inner wire are the areas where the Bowden cable inner wire is secured on the actuating element and on the operating element. The ends of the Bowden cable housing are preferably arranged spatially adjacent to the ends of the Bowden cable inner wire.

Advantageously, the power tool has a mounting aid with a receptacle for a first end of the Bowden cable housing. This mounting aid is arranged at a first one of the two subassemblies and projects toward the second one of the two subassemblies. The receptacle is advantageously arranged adjacent to the second one of the two subassemblies. In this way, the Bowden cable housing can be arranged proximal to the correlated end of the Bowden cable inner wire. Advantageously, the position of the receptacle is defined by the second one of the two subassemblies. In this way, a defined position of the end of the Bowden cable inner wire to the end of the Bowden cable housing is realized. Manufacturing tolerances that occur between the receptacle of the mounting aid and the subassembly where the actuating element is supported can be minimized in this way. Advantageously, the mounting aid is elastically deformed by the second one of the two subassemblies. In this way, it is ensured that the mounting aid is resting against the second subassembly so that a defined position results.

In particular, the mounting aid has at least one arm that spans the distance formed between the two subassemblies. The arm can be of a delicate configuration because it must hardly transmit forces in operation. Advantageously, the arm has a thin-walled, in particular rectangular, cross-section. A thin-walled cross-section is to be understood as a cross-section in which the ratio of maximum width to maximum thickness is at least 2, in particular at least 3. For a rectangular cross-section of the arm that has advantageously rounded corners, a simple configuration results. The arm can however also have a different, for example, a T-shaped or L-shaped, cross-section.

A simple configuration results when the mounting aid is configured as a separate component and is secured on a housing part of the first subassembly. Advantageously, the mounting aid has means for positioning the second subassembly. The means for positioning the second subassembly are advantageously arranged adjacent to the receptacle. In this way, a correct positioning of the subassemblies on each other and a correct positioning of the mounting aid on the second subassembly can be ensured in a simple way.

Water may collect in the power tool in operation. This is particularly the case when the power tool has a tool member that is cooled with water, for example, a cut-off machine. In order to drain this water in a targeted fashion, it is provided that the mounting aid has at least one drain element for draining the collected liquid. The drain element is advantageously arranged adjacent to the receptacle. In this way, it can be avoided that liquid, in particular water, can be guided via the mounting aid from the second subassembly to the first subassembly.

Advantageously, the mounting aid has a partition that separates at least partially different areas of the power tool from each other. By integration of the partition into the mounting aid, an additional component for the partition can be avoided. For example, the partition can serve for separating from each other different cooling areas of the power tool.

Advantageously, both ends of the Bowden cable housing are secured on the second subassembly. The actuating element is advantageously connected fixedly with the drive motor and connected by means of at least one anti-vibration element with a subassembly component of the second subassembly. The Bowden cable therefore must span the vibration gap that is formed between the first subassembly and the drive motor. In order to prevent that the mounting aid in operation must compensate relative movements between the drive motor and the first subassembly, it is provided that the mounting aid is secured on the subassembly component of the second subassembly. Accordingly, the mounting aid must not span the vibration gap.

A simple configuration results when the mounting aid is attached with at least one locking element on the subassembly component. The locking element has advantageously an opening for engagement of a tool so that the locking element can be released easily. The tool, because of the opening, can engage from below the locking hook and release it. This is in particular advantageous when the locking hook is not accessible from all sides.

BRIEF DESCRIPTION OF THE DRAWINGS

One embodiment of the invention will be explained in the following with the aid of the drawing.

DESCRIPTION OF PREFERRED EMBODIMENTS

Figure 1:
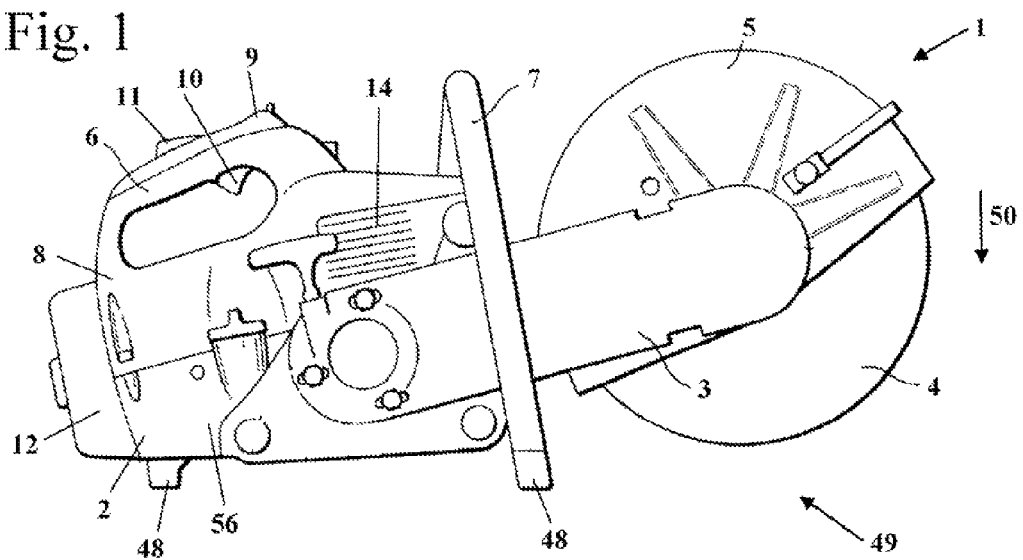
FIG. 1 shows a schematic side view of a cut-off machine.

FIG. 1 shows a hand-held power tool, namely a cut-off machine 1, as an embodiment of a power tool. The mounting aid to be described in the following can also be advantageous in connection with other power tools such as motor chainsaws, hand-held blowers or the like. The cut-off machine 1 has a power tool housing 2 on which a top handle 6 and a handle bar 7 are secured. The power tool housing 2 has legs 48 with which the cut-off machine 1 is resting on the ground or another flat surface in the usual rest position 49, shown in FIG. 1. FIG. 1 shows also the direction of action 50 of gravity in the rest position 49.

On the power tool housing 2 a cantilever arm is secured having at its free end a cutter wheel 4. The cutter wheel 4 is driven in rotation by a drive motor 14 that is at least partially arranged within the power tool housing 2. The cutter wheel 4 is covered across more than half of its circumference by a protective cover 5.

As shown in FIG. 1, the power tool housing 2 has an air filter cover 12 as well as a hood 8. On the hood 8 the handle 6 is formed. On the handle 6 a throttle trigger 10 and a throttle trigger lock 11 are pivotably supported. The top area of the top handle 6 is covered by a separate cover 9. As also shown in FIG. 1, the power tool housing 2 comprises a motor housing 56 on which the hood 8 is secured (e.g. by screws).

Figure 2:
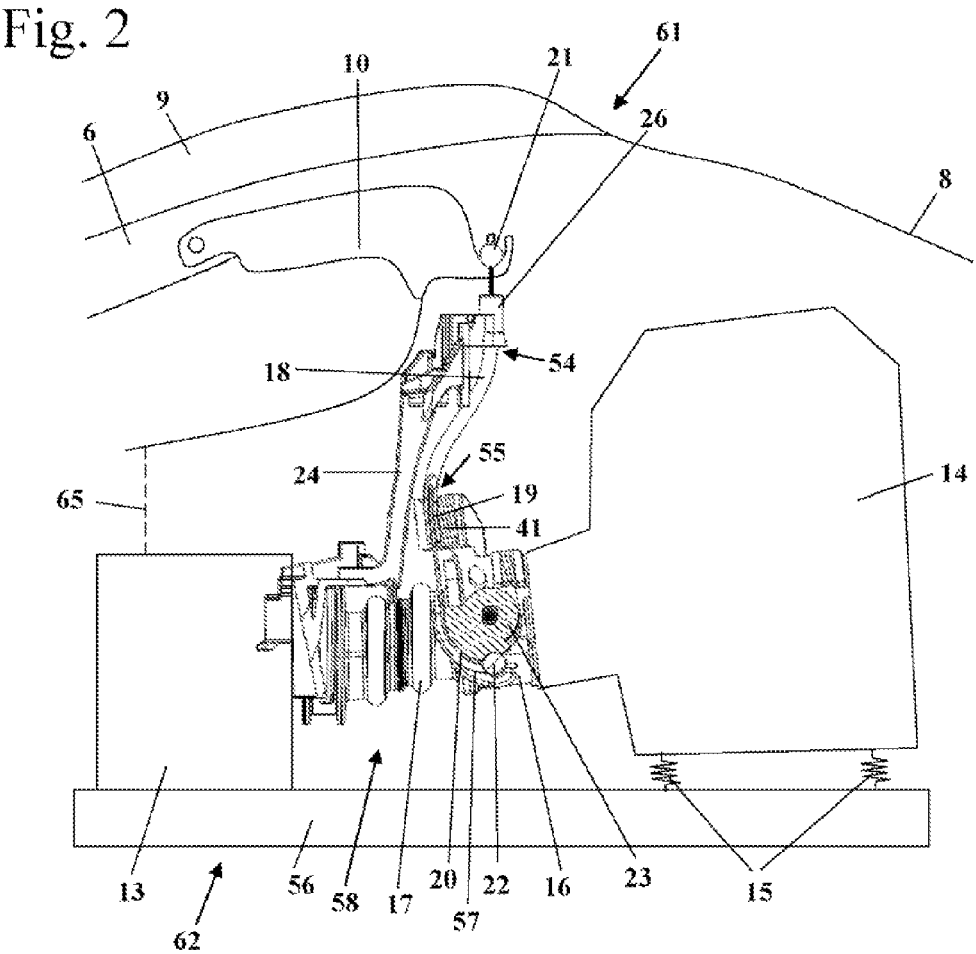
FIG. 2 is a schematic illustration of the arrangement of the subassemblies of the cut-off machine.

FIG. 2 shows the configuration of the cut-off machine 1 in detail. The cut-off machine 1 comprises a first subassembly 61 that comprises the hood 8, the top handle 6, the cover 9, the throttle trigger 10, and the throttle trigger lock 11, not shown in FIG. 2. A second subassembly 62 comprises the motor housing 56 and an air filter housing 13 that is fixedly arranged on the motor housing 56. The air filter housing 13 can also be integrated partially into the motor housing 56. On the motor housing 56, the drive motor 14 is supported with antivibration elements 15 so as to be vibration-isolated. The drive motor 14 is also part of the second subassembly 62. On the drive motor 14, a throttle housing 16 is secured that is also a part of the second subassembly 62 and in which a throttle element, not shown in FIG. 2, for example, a throttle flap or a throttle barrel, is pivotably supported. On the exterior side of the throttle housing 16, a throttle lever 23 is secured that has a groove 57 for receiving the Bowden cable inner wire 20 of a Bowden cable 18. The Bowden cable inner wire 20 is secured with a first end 21 on the throttle trigger 10, in particular hooked. A second end 22 of the Bowden cable inner wire 20 is secured at the end of the groove 57 on the throttle lever 23. The Bowden cable 18 has also a Bowden cable housing 19 that is secured with a first end 54 in a receptacle 26 and with a second end 55 in a second receptacle 41. The first subassembly 61 is fixedly connected to the motor housing 56 and is vibration-decoupled from the drive motor 14. The Bowden cable 18 spans thus the vibration gap 58 that is formed between the drive motor 14 and the first subassembly 61. The drive motor 14 is connected by means of a flexible intake socket 17 that is secured on the throttle housing 16 with the air filter housing 13. The intake socket 17 is comprised of an elastic material, for example, rubber, and spans also the vibration gap 58.

As shown in FIG. 2, the first receptacle 26 is formed on a mounting aid 24 which is secured on the second subassembly 62 adjacent to the intake socket 17. The mounting aid 24 spans the distance between the two subassembly 61 and 62 and projects from the second subassembly 62 up to the first subassembly 61. The receptacle 26 is arranged adjacent to the throttle trigger 10, in particular proximal to the area of the throttle trigger 10 where the first end 21 of the Bowden cable inner wire is secured on the throttle trigger 10. When mounting the Bowden cable 18, the Bowden cable housing 19 is mounted on the second subassembly 62. When doing this, the two ends 54 and 55 of the Bowden cable housing 19 are fixed. Also, the second end 22 of the Bowden cable inner wire 20 is hooked. Subsequently, the cover 8 is attached. Only after the hood 8 has been attached, the access to the Bowden cable 18 is limited. Through the still open opening that is to be closed by the cover 9 after mounting of the first subassembly 61 on the second subassembly 62, the first end 21 of the Bowden cable inner wire 20 can be hooked on the throttle trigger 10. This is easily possible because the first end 21 is positioned by the mounting aid 24 as a result of the fixation of the first end 54 of the Bowden cable housing 19 adjacent to the throttle trigger 10. Subsequently, the cover 9 can be mounted on the hood 8. For mounting the first end of the Bowden cable inner wire, only very little space and only a very small access opening are required due to securing the first end 54 of the Bowden cable housing 19 on the second subassembly 62. In this way, the power tool housing 2 of the cut-off machine 1 can be designed to be substantially closed and the opening that is to be closed by the cover 9 can be designed to be very small.

Figure 3:
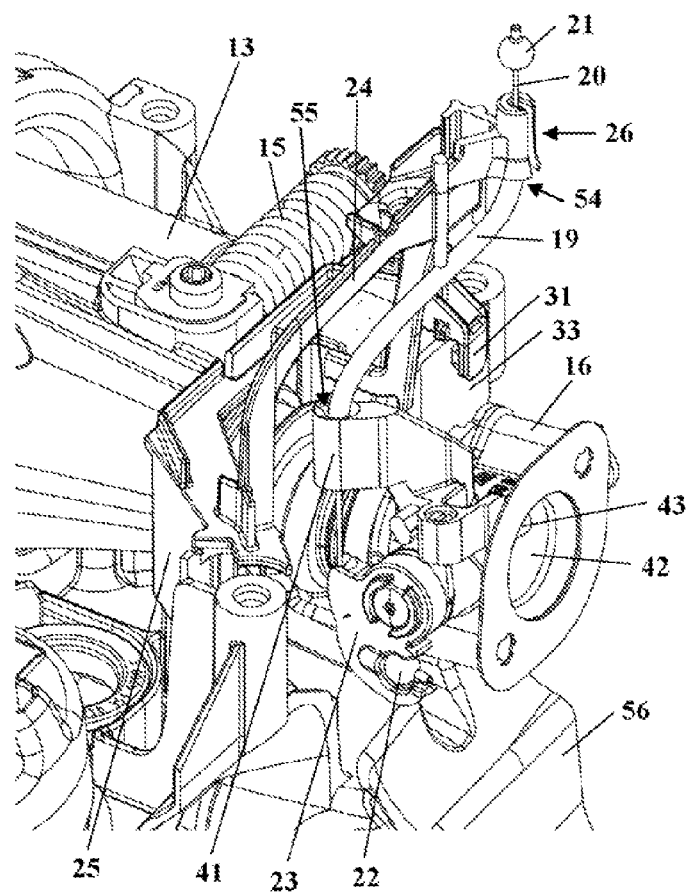
FIG. 3 is a perspective detail illustration of the second subassembly of the cut-off machine with mounting aid arranged thereat.

FIG. 3 shows the arrangement of the mounting aid 24 and of the Bowden cable 18 in detail. The mounting aid 24 is designed as a separate component and is attached to the motor housing 56. A partition 25 is integrated with the mounting aid 24 and separates the area of the air filter housing 13 from the area of the throttle housing 16. In this way, different cooling zones can be achieved in a simple way for the cut-off machine 1. FIG. 3 shows also the constructive configuration of one of the antivibration elements 15 that comprises a coil spring as a damping element in this embodiment. As illustrated also in FIG. 3, in the throttle housing 16 a throttle shaft 43 is supported that carries a throttle flap, not illustrated. In the throttle housing 16 an intake passage 42 is formed that can be released or substantially closed by the throttle element. The drive motor 14 is embodied as an internal combustion engine, in particular as a two-stroke engine or as a four-stroke engine that is lubricated by a fuel-oil mixture. As illustrated also in FIG. 3, the mounting aid 24 is secured on a housing wall 33 of the motor housing 56 by means of a locking hook 31 that is integrally formed on the mounting aid 24. In the illustrated embodiment, the mounting aid 24 is comprised of plastic material. The mounting aid 24 is advantageously produced as a monolithic component, in particular by an injection molding process.

Figure 4:
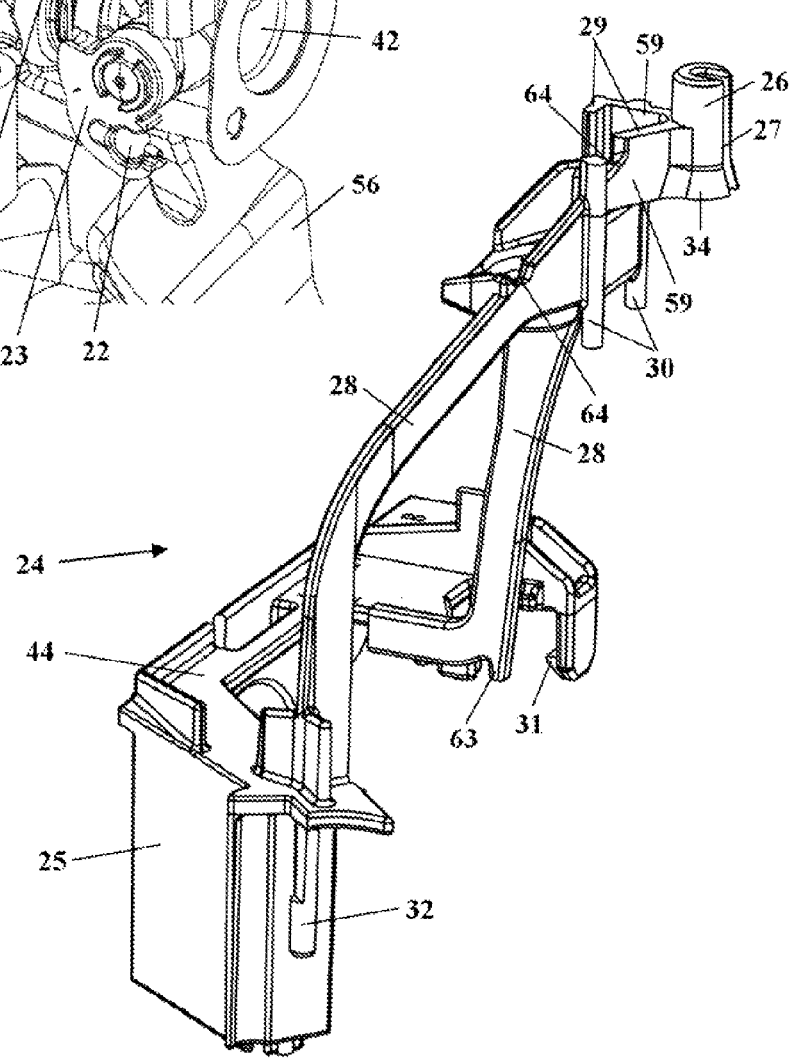
FIGS. 4 and 5 each show a perspective illustration of the mounting aid.
Figure 5:
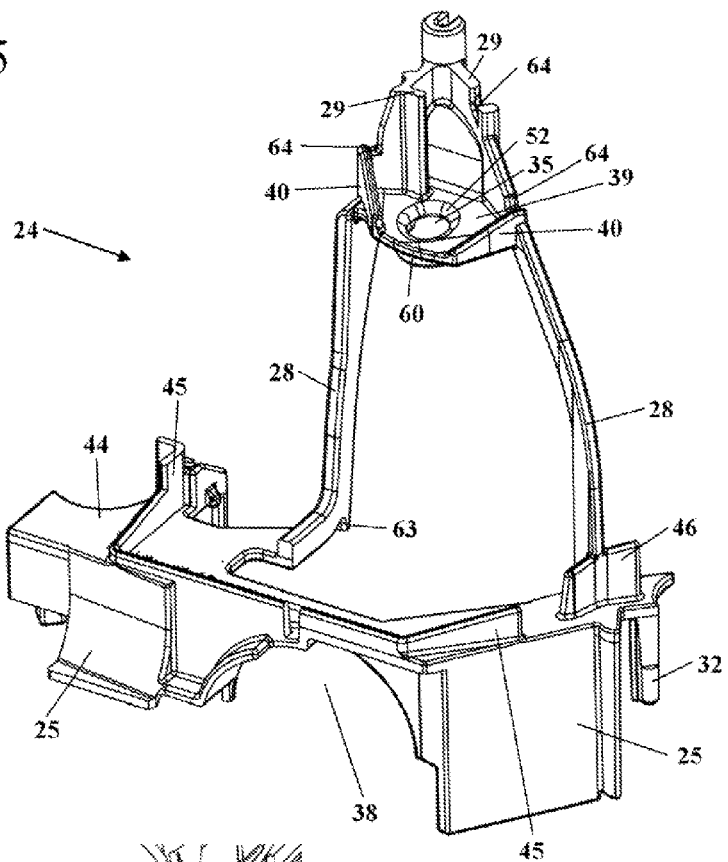

FIGS. 4 and 5 show the configuration of the mounting aid 24 in detail. The mounting aid 24 has in the area of the partition 25 several guide pins 32 with which it is positioned on the motor housing 56 and pre-fixed on the motor housing 56. An additional fixation by the locking hook 31 is provided. For a good separation of cooling zones of the cut-off machine 1, a separation plate 44 is provided that extends in the illustrated embodiment approximately perpendicular to the partition 25 and approximately horizontal in the rest position 49. On the topside of the separation plate 44 that is facing away from the partition 25, separation plate sections 45 are arranged that project in upward direction perpendicularly from the separation plate 44. By means of the separation plate 44, a high stability is also imparted to the mounting aid 24. The partition 25, the separation plate 44 and the separation plate sections 45 serve for separating the cooling zones of the cut-off machine 1.

The mounting aid 24 has two arms 28 that each have an approximately rectangular cross-section and that project from the separation plate 44 to the vicinity of the receptacle 26. The receptacle 26 is approximately cylindrical and has a slot 27 that extends in longitudinal direction of the cylinder and through which the Bowden cable inner wire can be guided. The Bowden cable housing is secured frictionally, i.e. is clamped, in the receptacle 26. Two ribs 59 extend outwardly away from the receptacle 26. The ribs 59 each have a stop surface 29 on the end facing the hood 8. The ribs 59 pass into the arms 28. Adjacent to the receptacle 26, the mounting aid 24 has a wall 39 that extends transversely to the arms 28 and that has a central opening 35. In the rest position 49 of the cut-off machine 1 illustrated in FIG. 1, the wall 39 extends at an incline toward a drain edge 60. Guide walls 42 are arranged on the sides of the wall 39 laterally adjacent to the drain edge 60. In this way, liquid that collects on the wall 39 is drained across the drain edge 60. Accordingly, it is prevented that the liquid can flow along the arms 28 of the mounting aid 24 into the area of the cut-off machine 1 where the intake air is sucked in by the drive motor 14. In the illustrated cut-off machine 1, the combustion air is sucked in from the area that is positioned at the side of the partition 25 that is facing away from the throttle housing 16.

Figure 6:
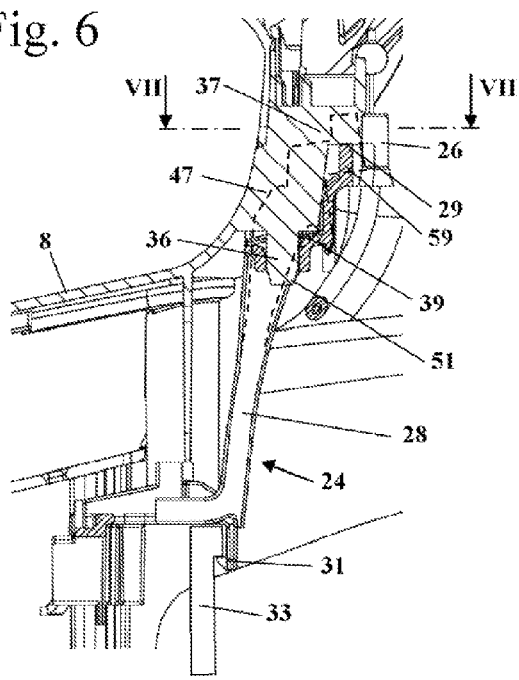
FIG. 6 is a section view of the power tool housing of the cut-off machine in the area of the mounting aid.

The opening 35 of the wall 39 has a rounded portion 52 at its periphery that ensures that the centering pin 36 illustrated in FIG. 6 can engage easily the opening 35. On one of the arms 28 reinforcement webs 46 are arranged that are located in the area of the connection of the arms 28 with the separation plate 44. The other one of the two arms 28 is formed on a projecting section of the separation plate 44 so that high elasticity of the arrangement results. This arm 28 has adjacent to its connection to the separation plate 44 a drain element 63 that is formed as a downwardly projecting pin. The drain element 63 serves for draining liquid and avoids that liquid can flow into the area of intake of the combustion air by means of the mounting aid 24. As shown in FIG. 5, the partition 25 has a cutout 38 for the intake passage 42.

Figure 7:
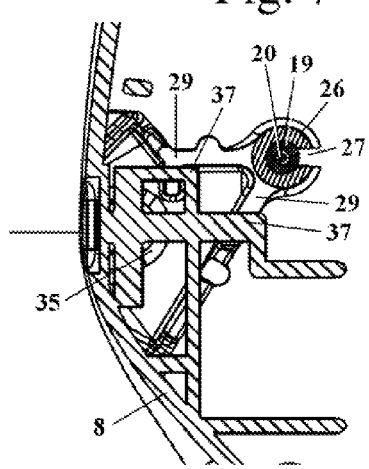
FIG. 7 is a section along the section line VII-VII in FIG. 6.

FIGS. 6 and 7 show the arrangement of the mounting aid 24 on the hood 8. In FIG. 6, by dashed line 47 the shape of the mounting aid 24 is shown, with the hood 8 not being attached. The mounting aid 24 is designed such it is elastically deformed when the hood 8 is attached; the hood 8 is then resting on the stop surface 29. As shown in FIG. 7, the hood 8 has housing webs 37 that are resting on the stop surfaces 29 of the ribs 59 and thereby elastically deform the mounting aid 24. The ribs 59 and the housing webs 37 extend transversely relative to each other and cross each other in the contact area. In this way, it is ensured that contact of the housing webs 37 on the contact surfaces 29 is possible also in case of unfavorable tolerances.

On the housing webs 37 of the hood 8, the centering pin 36 illustrated in FIG. 6 is arranged that has a bevel 51 at its free end; the bevel 51, in connection with the round portion 52 at the opening 35, provides a centering action. FIG. 6 shows also clearly the inclined position of the wall 39 in the illustrated rest position 49. The housing webs 37 are positioned exclusively at the contact surfaces 29. In the area of the wall 39 no contact between mounting aid 24 and hood 8 is provided. In this way, it is ensured that only the contact surfaces 29 define the position of the receptacle 26. The contact surfaces 29 are arranged very close to the receptacle 26 so that a comparatively exact positioning of the receptacle 26 relative to the hood 8 and to the throttle trigger 10 arranged at the hood 8 results.

Figure 8:
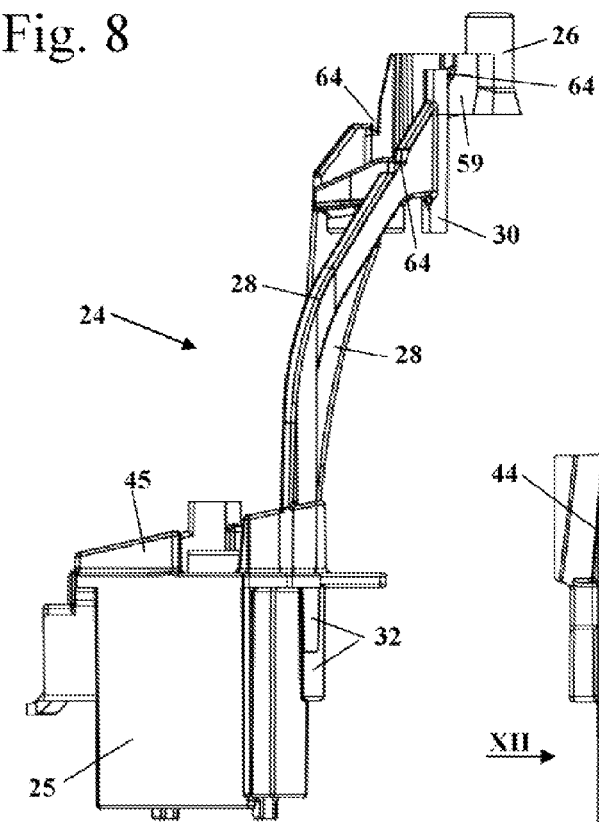
FIG. 8 is a side view of the mounting aid.

As shown in FIGS. 4 and 8, adjacent to the ribs 59 drain elements 30 are arranged on the arms 28. The drain elements 30 are formed as pins that extend approximately in vertical direction in the usual rest position 49. By means of the drain elements 30 liquid that has precipitated on the hood 8 or on the mounting aid 24, in particular precipitated water, can be drained. In this way, it is prevented that liquid can flow by means of the arms 28 of the mounting aid 24 from the hood 8 to the second subassembly 62 and to the air intake. In order to ensure that liquid does not flow along the topside of the arms 28 in downward direction to the separation plate 44, on the topside of the arms 28 recesses 64 are provided that interrupt the straight top edge of the arms 28 and interrupt drainage of the liquid in this way. The interruptions 64 ensure that liquid drains by means of the drain elements 30. Recesses 64 can be provided on the arms 28 on either side of the drain elements 30. The recesses 64 are also shown in FIG. 5.

Figure 9:
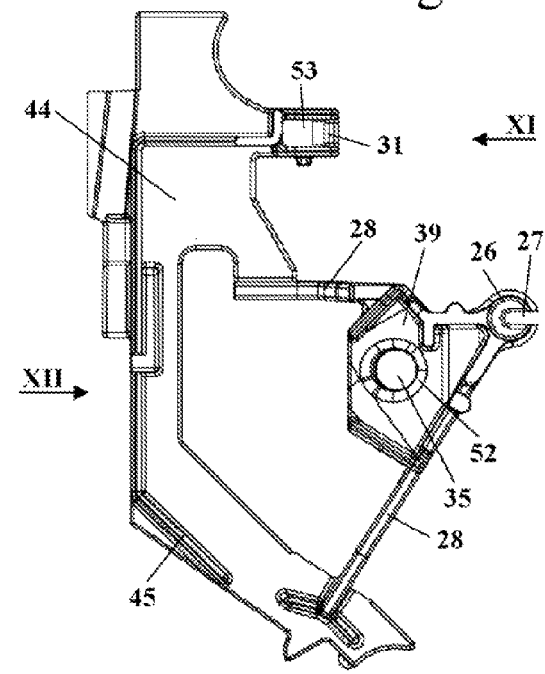
FIG. 9 is a top view of the mounting aid.
Figure 10:
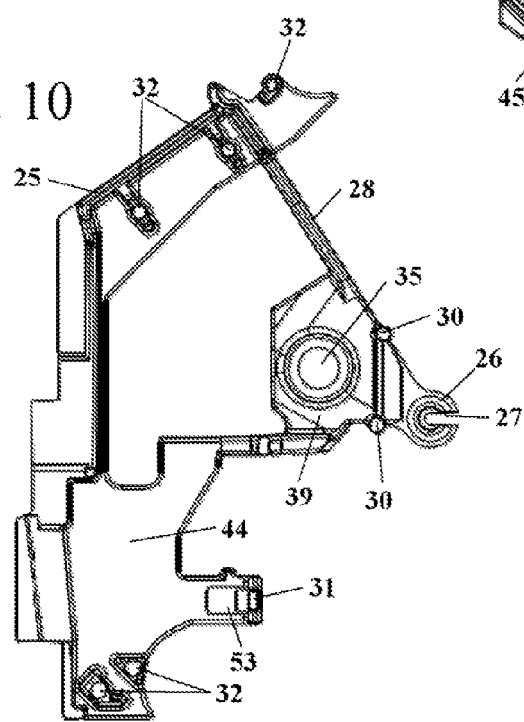
FIG. 10 is a bottom view of the mounting aid.

As shown in FIGS. 9 and 10, the locking hook 31 has at its topside an opening 53. A tool, for example, a screwdriver, can engage through the opening 53 and push the locking hook 31 outwardly and release it so that the mounting aid 24 can be demounted easily from the second subassembly 62. FIG. 10 shows also the arrangement of the guide pins 32 on the bottom side of the mounting aid 24 facing the second subassembly 62.

Figure 11:
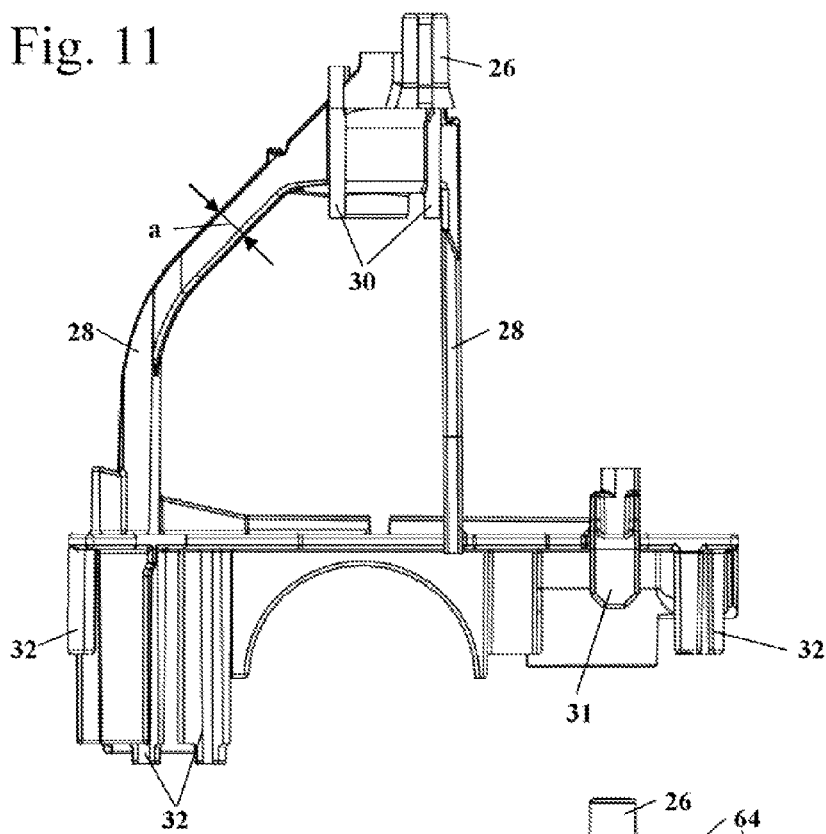
FIG. 11 is a side view of the mounting aid in the direction of arrow XI in FIG. 9.
Figure 12:
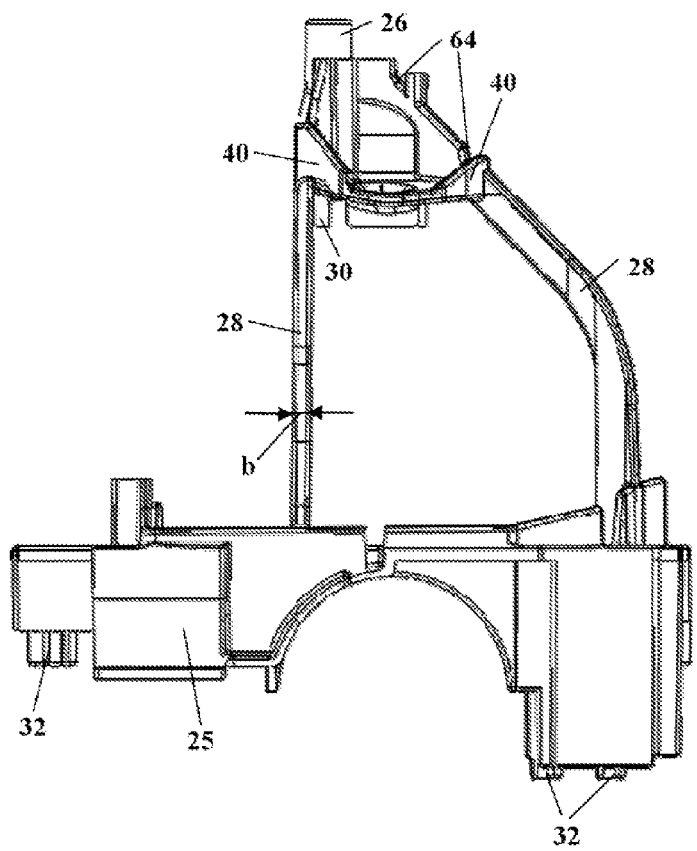
FIG. 12 is a side view of the mounting aid in the direction of arrow XII in FIG. 9.

As shown in FIG. 11, the arms 28 have a width a that is significantly greater than the thickness b. The width a has advantageously at least twice, in particular at least three times, the size of the thickness b. In this way, a minimal weight of the mounting aid 24 with sufficient stability is provided. The arms 28 as a result of the minimal thickness b and their large length are elastically deformable and can be deformed by the hood 8 when attached, as shown in FIG. 6. Since after mounting of the first subassembly 61 on the second subassembly 62, the receptacle 26 is supported on the first subassembly 61, the forces that are acting in operation at the receptacle 26 are absorbed largely by the first subassembly 61 so that the arms 28 do not need high stability. The cross-section of the arms 28 is selected such that the desired high elasticity results.

As shown in FIG. 4, on the side of the receptacle 26 that is facing the second subassembly 62 an insertion funnel 34 is formed so that the first end 54 of the Bowden cable housing 19 can be arranged easily in the receptacle 26. At the opposite side the receptacle 26 is closed with the exception of the slot 27 so that only the Bowden cable inner wire 20 can project through the receptacle 26.

In the illustrated embodiment, the mounting aid 24 is secured on the motor housing 56. However, it can also be provided that the mounting aid 24 is arranged at the first subassembly 61, for example, on the hood 8, and projects toward the second subassembly. A monolithic configuration of the mounting aid with another component of one of the subassembly may be advantageous.

The specification incorporates by reference the entire disclosure of German priority document 10 2011 120 469.9 having a filing date of Dec. 7, 2011.

While specific embodiments of the invention have been shown and described in detail to illustrate the inventive principles, it will be understood that the invention may be embodied otherwise without departing from such principles.

What is claimed is:

1. A power tool comprising:
a drive motor adapted to drive a tool member and having an actuating element;
a power tool housing comprising a first subassembly and a second subassembly that is connected with the first subassembly;
an operating element that is supported on the first subassembly;
a Bowden cable disposed within the power tool housing and comprising a Bowden cable housing and a Bowden cable inner wire arranged in the Bowden cable housing;
wherein the actuating element is a part of the second subassembly;
wherein the Bowden cable inner wire has a first end connected to the operating element and a second end connected to the actuating element, wherein the operating element acts on the actuating element through the Bowden cable;
wherein the Bowden cable housing has a first end and a second end and the first and second ends of the Bowden cable housing are secured on the same one of said first subassembly and said second subassembly.

2. The power tool according to claim 1, further comprising a mounting aid with a receptacle for the first end of the Bowden cable housing, wherein the mounting aid is arranged on one of the first and second subassemblies and projects toward the other one of the first and second subassemblies, and wherein the receptacle is arranged adjacent to said other one of the first and second subassemblies.

3. The power tool according to claim 2, wherein the mounting aid is supported adjacent to the receptacle on said other one of the first and second subassemblies.

4. The power tool according to claim 3, wherein the mounting aid is elastically deformed by said other one of the first and second subassemblies.

5. The power tool according to claim 2, wherein the mounting aid has at least one arm that spans a distance between the two subassemblies.

6. The power tool according to claim 5, wherein the at least one arm has a thin-walled cross-section.

7. The power tool according to claim 2, wherein the mounting aid is embodied as a separate component and is secured on a housing part of said one of the first and second subassemblies.

8. The power tool according to claim 2, wherein the mounting aid has positioning elements that position said other one of the first and second subassemblies.

9. The power tool according to claim 2, wherein the mounting aid has at least one drain element that drains liquid collecting in the power tool housing.

10. The power tool according to claim 2, wherein the mounting aid has a partition that separates different areas of the power tool at least partially from each other.

11. A power tool comprising:
a drive motor adapted to drive a tool member and having an actuating element;
a power tool housing comprising a first subassembly and a second subassembly that is connected with the first subassembly;
an operating element that is supported on the first subassembly;
a Bowden cable disposed within the power tool housing and comprising a Bowden cable housing and a Bowden cable inner wire arranged in the Bowden cable housing;
wherein the actuating element is a part of the second subassembly;
wherein the Bowden cable inner wire has a first end connected to the operating element and a second end connected to the actuating element, wherein the operating element acts on the actuating element through the Bowden cable;
wherein the Bowden cable housing has a first end and a second end;
wherein the first and second ends of the Bowden cable housing are both secured on said second subassembly.

12. The power tool according to claim 11, further comprising a mounting aid with a receptacle for the first end of the Bowden cable housing, wherein the mounting aid is arranged on the second subassembly and projects toward the first subassembly, wherein the receptacle is arranged adjacent to the first subassembly, wherein the actuating element is connected fixedly with the drive motor and the drive motor is connected by at least one anti-vibration element to a subassembly component of the second subassembly, wherein the mounting aid is secured on the subassembly component.

13. The power tool according to claim 12, wherein the mounting aid is attached by at least one locking element on the subassembly component, wherein the locking element has an opening though which a tool is insertable for releasing the locking element.

* * * * *